US007113218B2

(12) United States Patent
Battles et al.

(10) Patent No.: US 7,113,218 B2
(45) Date of Patent: Sep. 26, 2006

(54) DIGITAL DOCKING SYSTEM USER INTERFACE METHOD AND APPARATUS

(75) Inventors: Amy E. Battles, Windsor, CO (US); Robert P. Cazier, Fort Collins, CO (US); Kenneth Ross Stockton, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 703 days.

(21) Appl. No.: 10/271,842

(22) Filed: Oct. 15, 2002

(65) Prior Publication Data

US 2004/0070681 A1   Apr. 15, 2004

(51) Int. Cl.
*H04N 5/225* (2006.01)
(52) U.S. Cl. ............... 348/373; 348/207.1; 348/333.02
(58) Field of Classification Search ............ 348/207.1, 348/207.2, 373, 375, 372, 33.01, 333.02, 348/552, 207.99
See application file for complete search history.

(56) References Cited

U.S. PATENT DOCUMENTS

| | | | | |
|---|---|---|---|---|
| 6,154,210 | A * | 11/2000 | Anderson | 715/840 |
| 6,522,354 | B1 * | 2/2003 | Kawamura et al. | 348/231.2 |
| 6,882,299 | B1 * | 4/2005 | Allport | 341/176 |
| 2002/0051629 | A1 * | 5/2002 | Endo | 386/113 |
| 2003/0011702 | A1 * | 1/2003 | Ohmura et al. | 348/372 |
| 2003/0063215 | A1 * | 4/2003 | Tsuji | 348/375 |
| 2003/0160890 | A1 * | 8/2003 | Caspe et al. | 348/372 |
| 2003/0214602 | A1 * | 11/2003 | Battles et al. | 348/375 |
| 2004/0201774 | A1 * | 10/2004 | Gennetten | 348/375 |

OTHER PUBLICATIONS

Pending U.S. Appl. No. 10/146,282, Filed May 14, 2002. "Camera Docking System With Multiple Controls," Amy E. Battles et al., HP PDNO 100111768-1.
Pending U.S. Appl. No. 09/871,320, Filed May 30, 2001. "Camera Docking Solution Provides A User Interface For Printers, CD Writers And Other Devices," K. Douglas Gennetten et al., HP PDNO 10007460-1.

* cited by examiner

*Primary Examiner*—Ngoc-Yen Vu
*Assistant Examiner*—Gregory Madden

(57) ABSTRACT

A digital camera docking system user interface provides, on the display of the digital camera, information regarding the operation of the digital camera docking system. The user interface may guide the user in the initiation of interactions between the digital camera and external devices such as television monitors, personal computers, and printers and may also provide feedback regarding the progress of these interactions.

29 Claims, 7 Drawing Sheets

DIGITAL DOCKING SYSTEM USER INTERFACE METHOD AND APPARATUS

FIELD OF THE INVENTION

The present invention relates generally to digital cameras and more specifically to user interfaces for digital camera docking systems.

BACKGROUND OF THE INVENTION

Digital camera users frequently need to recharge the camera, upload images to a personal computer (PC), or print images stored in the camera. These tasks are facilitated by a docking station that serves as both a battery charger and a connection point for other external devices such as televisions, PCs, and printers. One variety of docking station provides a connection between a digital camera and a PC only. A multi-function docking station, on the other hand, may provide connections between the digital camera and multiple external devices. For example, the docking station may be connected to both a television monitor and a PC or printer at the same time. Unfortunately, it is not always clear to the user how to initiate and control an interaction between the digital camera and an external device using the docking station.

It is thus apparent that there is a need in the art for an improved digital camera docking system user interface method and apparatus.

SUMMARY OF THE INVENTION

A digital camera docking system user interface method is provided. A digital camera docking system for carrying out the method is also provided.

Other aspects and advantages of the present invention will become apparent from the following detailed description, taken in conjunction with the accompanying drawings, illustrating by way of example the principles of the invention.

DETAILED DESCRIPTION OF THE INVENTION

Use of a digital camera docking system is facilitated by providing information concerning the operation of the digital camera docking system on the display of the connected digital camera. The docking station may have at least one connection port for external devices. The docking station may automatically detect what external devices, if any, are connected with the docking station. A graphic representing a control element (e.g., a pushbutton) on the docking station may be shown on the display of the digital camera, along with text or other annotation indicating to a user that activating a particular control element will actuate a corresponding control function in the digital camera docking system. Actuating the control function may initiate an interaction between the digital camera and an external device that is connected to the corresponding connection port. Once an interaction such as a TV slideshow, the uploading of images, or the printing of images has been initiated, the digital camera display may provide feedback on the progress of the interaction. These and other aspects of the invention will be described in further detail throughout the remainder of this description.

Figure 1:
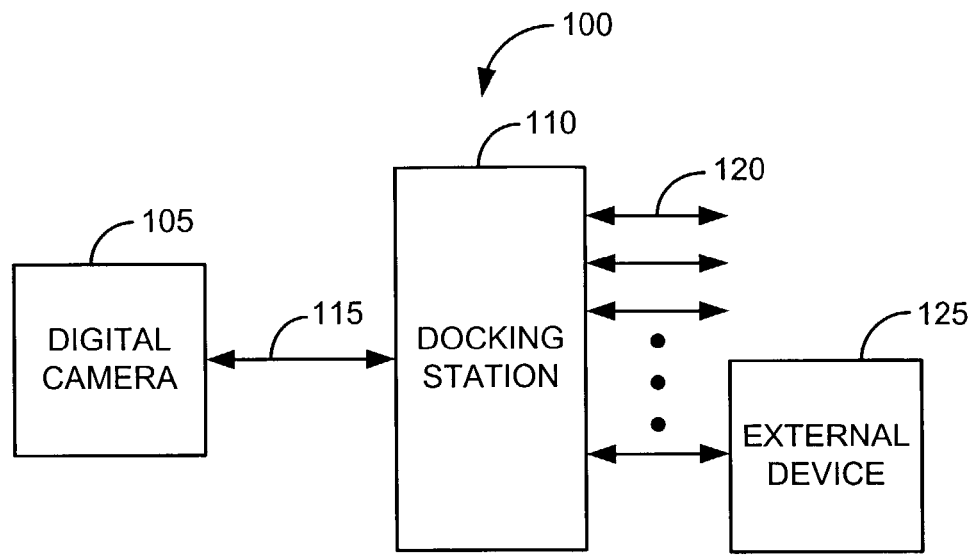
FIG. 1 is a block diagram of a digital camera docking system in accordance with an illustrative embodiment of the invention.

FIG. 1 is a block diagram of a digital camera docking system 100 in accordance with an illustrative embodiment of the invention. In FIG. 1, digital camera 105 is connected with docking station 110 via connector 115. Docking station 110 may include connections 120 for at least one external device 125 such as a television monitor, a personal computer (PC), a printer, or any other external device with which digital camera 105 may communicate. In some implementations, at least one of the connections 120 is a Universal System Bus (USB) port. For simplicity, digital camera docking stations do not typically include an internal USB hub, although such an implementation is certainly possible. Throughout this description, "digital camera docking station" refers to the system just described in FIG. 1, including any connected external devices 125.

Figure 2:
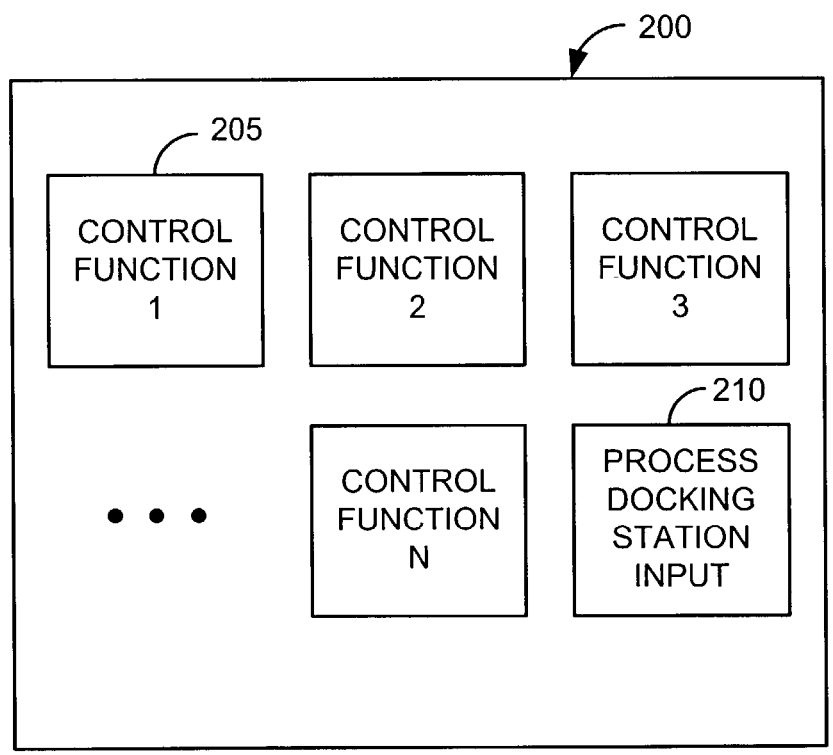
FIG. 2 is a functional diagram of digital camera firmware in accordance with an illustrative embodiment of the invention.

FIG. 2 is a functional diagram of digital camera firmware 200 in accordance with an illustrative embodiment of the invention. In FIG. 2, digital camera firmware 200 comprises a set of N control functions 205, one for each connection 120 on docking station 110, and module "Process Docking Station Input" 210. Module "Process Docking Station Input" 210 may process input received from docking station 110 in response to the activation of an input control ("control element") on the docking station. For example, docking station 110 may, via connector 115, transmit an encoded request to digital camera 105 requesting that a particular control function be actuated. The ith control function 205 may then initiate a task or "interaction" between digital camera 105 and the external device 125 connected with the ith docking station connection 120. Each control function 205 may include the necessary protocols for communication between digital camera 105 and a particular type of external device 125. Although control functions 205 are preferably implemented in firmware 200 of digital camera 105, a different architecture may place control functions 205 in docking station 110. In this case, docking station 110 plays the dominant role in digital camera docking system 100, and digital camera 105 plays a relatively passive role.

In a typical implementation, docking station 110 includes a microprocessor (not shown in FIG. 1) for carrying out functions such as detecting the presence of connected external devices 125, establishing connections between digital camera 105 and a specified connection 120, and passing requests for control functions 205 to digital camera 105. Once docking station 110 has established a connection between digital camera 105 and an external device 125, the corresponding control function 205 may control the interaction until it is complete.

Figure 3A:
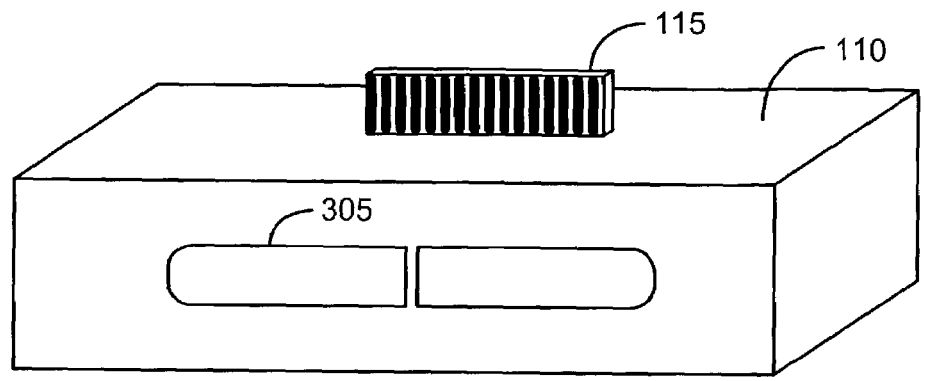
FIG. 3A is an illustration of a docking station in accordance with an illustrative embodiment of the invention.

FIG. 3A is an illustration of docking station 110 in accordance with an illustrative embodiment of the invention. Shown in FIG. 3A are connector 115 and two control elements 305. Control elements 305 may be, for example, pushbuttons or other suitable input controls. In other implementations, more or fewer than two control elements 305 may be included. For example, a single multi-position control element may actuate control functions 205. In still other embodiments, docking station 110 may have no control elements 305. In the embodiment shown in FIG. 3A, each of the two control elements 305 uniquely corresponds to one of two connections 120 on docking station 110. In this particular illustrative embodiment, one control element 305 corresponds to a TV connection and the other to a USB (e.g., PC or printer) connection. The TV connection facilitates the displaying of images stored in digital camera 105 on a connected television monitor. The USB connection facilitates the uploading of images stored in digital camera 105 to a connected PC or the printing of one or more images on a connected printer.

Figure 3B:
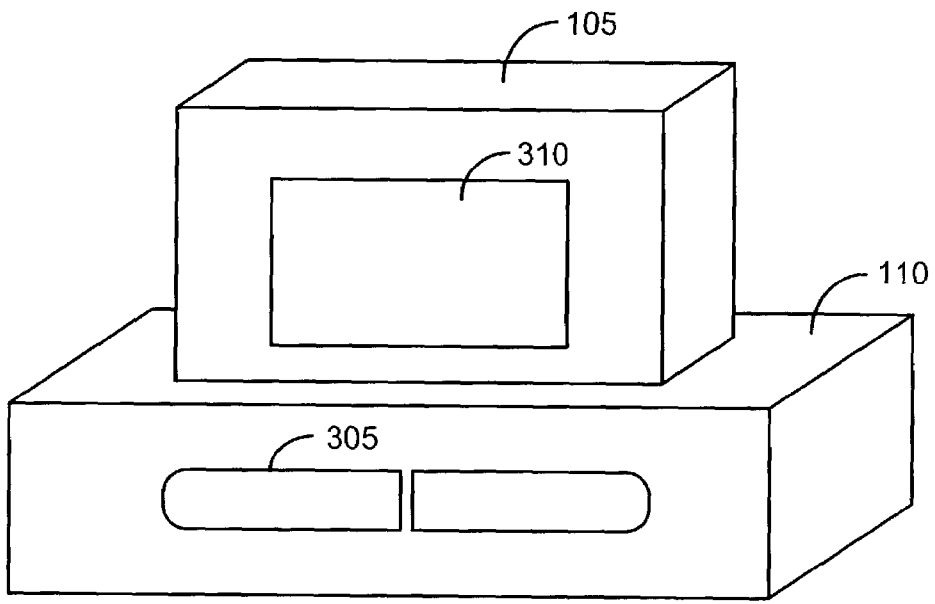
FIG. 3B is an illustration of a digital camera connected with the docking station shown in FIG. 3A in accordance with an illustrative embodiment of the invention.

FIG. 3B is an illustration of digital camera 105 connected with docking station 110 in accordance with an illustrative embodiment of the invention. Also shown in FIG. 3B is display 310 on digital camera 105. As shown in FIG. 3B, it is advantageous to configure docking station 110 such that digital camera 105 docks with display 310 facing the portion of docking station 110 on which the control elements 305 are found. This enables a user to see display 310 while operating control elements 305.

Figure 4A:
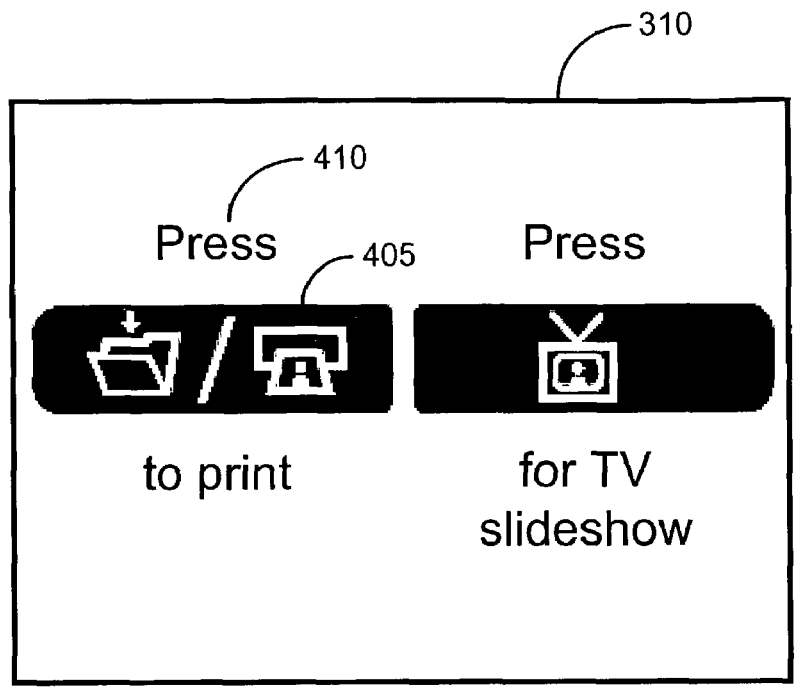
FIG. 4A is an illustration of a digital camera display containing information regarding the operation of the digital camera docking system shown in FIG. 1 in accordance with an illustrative embodiment of the invention.

FIG. 4A is an illustration of digital camera display 310 containing information regarding the operation of digital camera docking system 100 in accordance with an illustrative embodiment of the invention. In FIG. 4A, display 310 shows a graphic 405 for each detected connected external device 125. Each graphic 405 represents a control element 305 on docking station 110. Activation of the represented control element 305 on docking station 110 actuates the corresponding control function 205. Graphic 405 may suggest the shape and/or color of the represented control element 305. In the example of FIG. 4A, two external devices 125 have been detected. Each graphic 405 may further include pictorial representations of one or more external devices 125 associated with the represented control element 305, as shown in FIG. 4A. Such pictorial representations of external devices may also be advantageously included on the represented control elements 305 themselves. In this particular example, the left graphic 405 in FIG. 4A is associated with uploading images to a PC or printing, and the associated connection 120 may be a USB port. The right graphic 405 in FIG. 4A is associated with the displaying of a slideshow on a television monitor. Each graphic 405 may also be annotated with text 410 explaining how to actuate the control function 205 corresponding to the represented control element 305. Text 410 provides the user with clear and helpful guidance regarding the operation of digital camera docking system 100. In other embodiments, graphic 405 may be omitted, and information regarding the operation of digital camera docking system 100 may be provided using text 410 only.

Figure 4B:
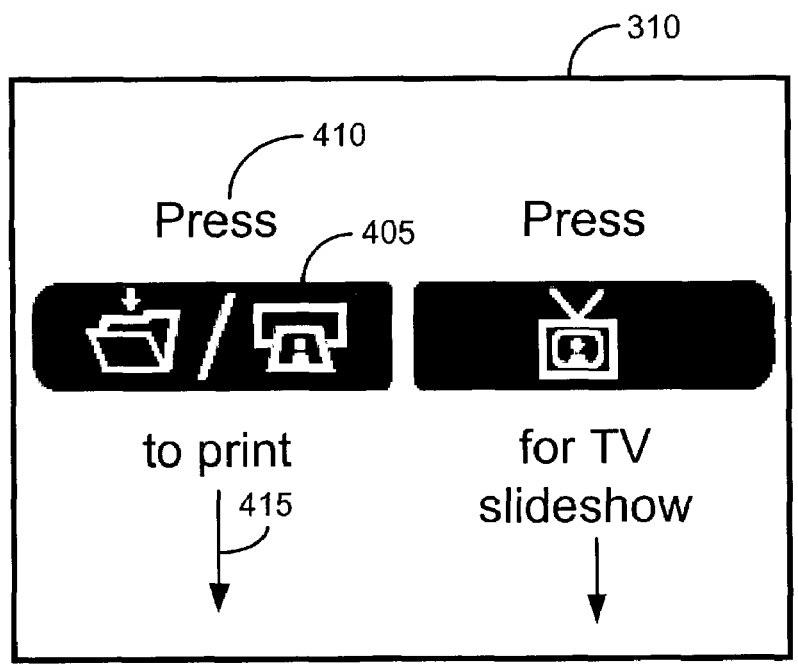
FIG. 4B is an illustration of a digital camera display containing information regarding the operation of the digital camera docking system shown in FIG. 1 in accordance with another illustrative embodiment of the invention.

FIG. 4B is an illustration of digital camera display 310 containing information regarding the operation of digital camera docking system 100 in accordance with another illustrative embodiment of the invention. In FIG. 4B, each graphic 405 is further annotated with an arrow 415 pointing toward the represented control element 305 on docking station 110. Arrow 415 provides additional assurance to the user that activating a particular control element 305 will actuate the desired control function 205 and that, therefore, the desired interaction will be initiated.

Figure 4C:
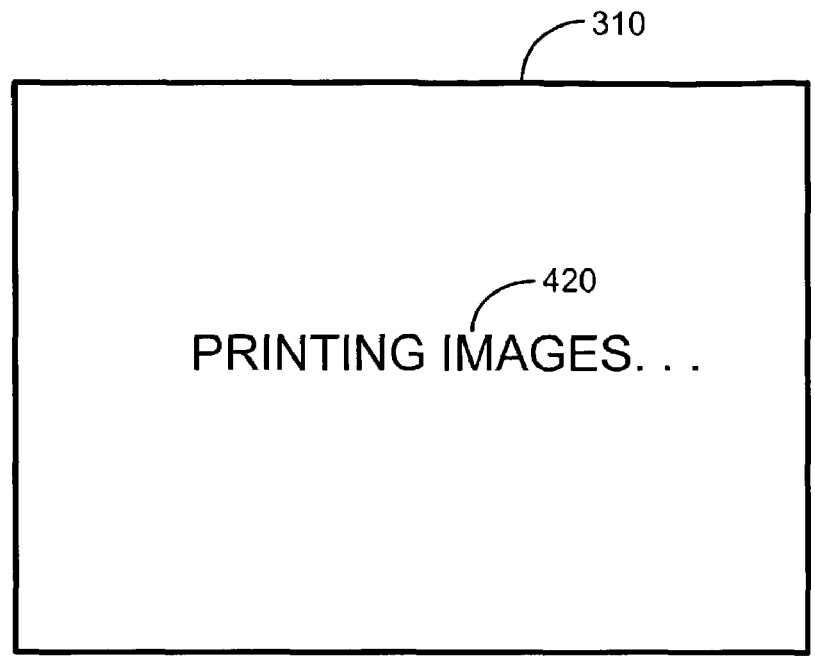
FIG. 4C is an illustration of a digital camera display containing feedback regarding the progress of an interaction between the digital camera and a printer in accordance with an illustrative embodiment of the invention.

FIG. 4C is an illustration of a digital camera display 310 containing feedback regarding the progress of an interaction between the digital camera and a printer in accordance with an illustrative embodiment of the invention. Once an interaction has been initiated between digital camera 105 and an external device 125, display 310 may also provide feedback regarding the progress or status of the interaction. In the example of FIG. 4C, an interaction between digital camera 105 and a printer connected to docking station 110 has been initiated. Display 310 may provide feedback 420 indicating that images are being printed. If an error were to occur, display 310 may also provide an appropriate error message to the user.

Figure 4D:
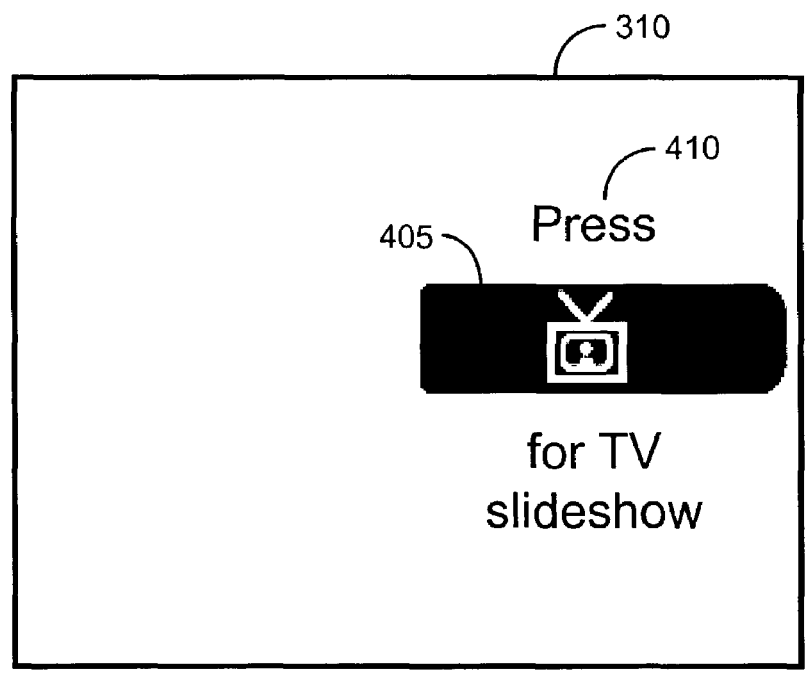
FIG. 4D is an illustration of a digital camera display following completion of an interaction between the digital camera and a printer in accordance with an illustrative embodiment of the invention.

Once a transaction such as the printing of images is complete, docking station 110 may optionally remove from display 310 the graphic 405 and annotation associated with the just-completed transaction. For example, if all the images stored in digital camera 105 have been uploaded to a PC, the corresponding graphic 405 may be removed from display 310 to indicate that all images have already been uploaded to the PC. Disconnecting and then reconnecting digital camera 105 and docking station 110, however, may restore all graphics 405 associated with all detected connected external devices 125. In FIG. 4D, one or more images stored in digital camera 105 have just been printed. Accordingly, the graphic 405 associated with the USB connection 120 for uploading and printing (see FIGS. 4A and 4B) has been removed from display 310, leaving only the graphic 405 associated with a TV connection.

Figure 4E:
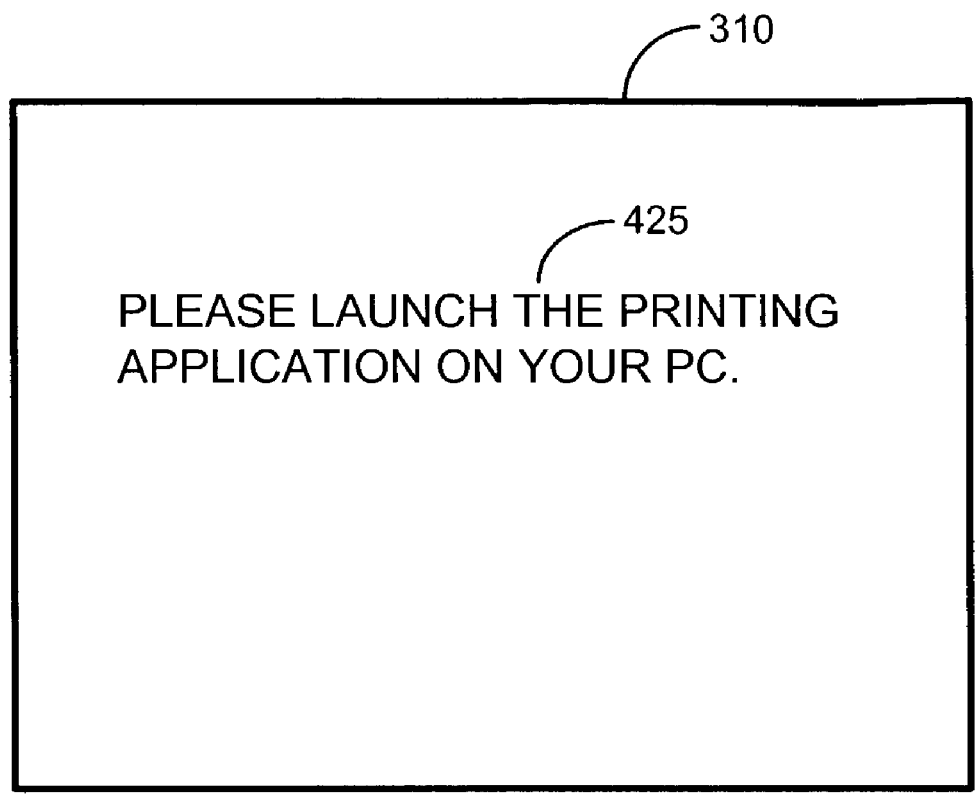
FIG. 4E is an illustration of a digital camera display containing instructions for initiating an interaction of the digital camera and a connected other external device from the connected other external device in accordance with another illustrative embodiment of the invention.

FIG. 4E is an illustration of digital camera display 310 containing instructions for initiating, from a PC connected with docking station 110, an interaction of digital camera 105 and the PC in accordance with another illustrative embodiment of the invention. In this embodiment, docking station 110 includes no control elements 305. Instead display 310 provides instructions for initiating interactions of digital camera 105 with one or more connected external devices 125 from the connected external devices 125 themselves. In the specific example of FIG. 4E, text 425 instructs the user to launch a printing application program on the PC to print images stored in digital camera 105. In this embodiment, the connected external device 125 may send signals over connection 120 to docking station 110, which may in turn pass a request for the interaction (printing images) to digital camera 105 via connector 115.

Figure 5A:
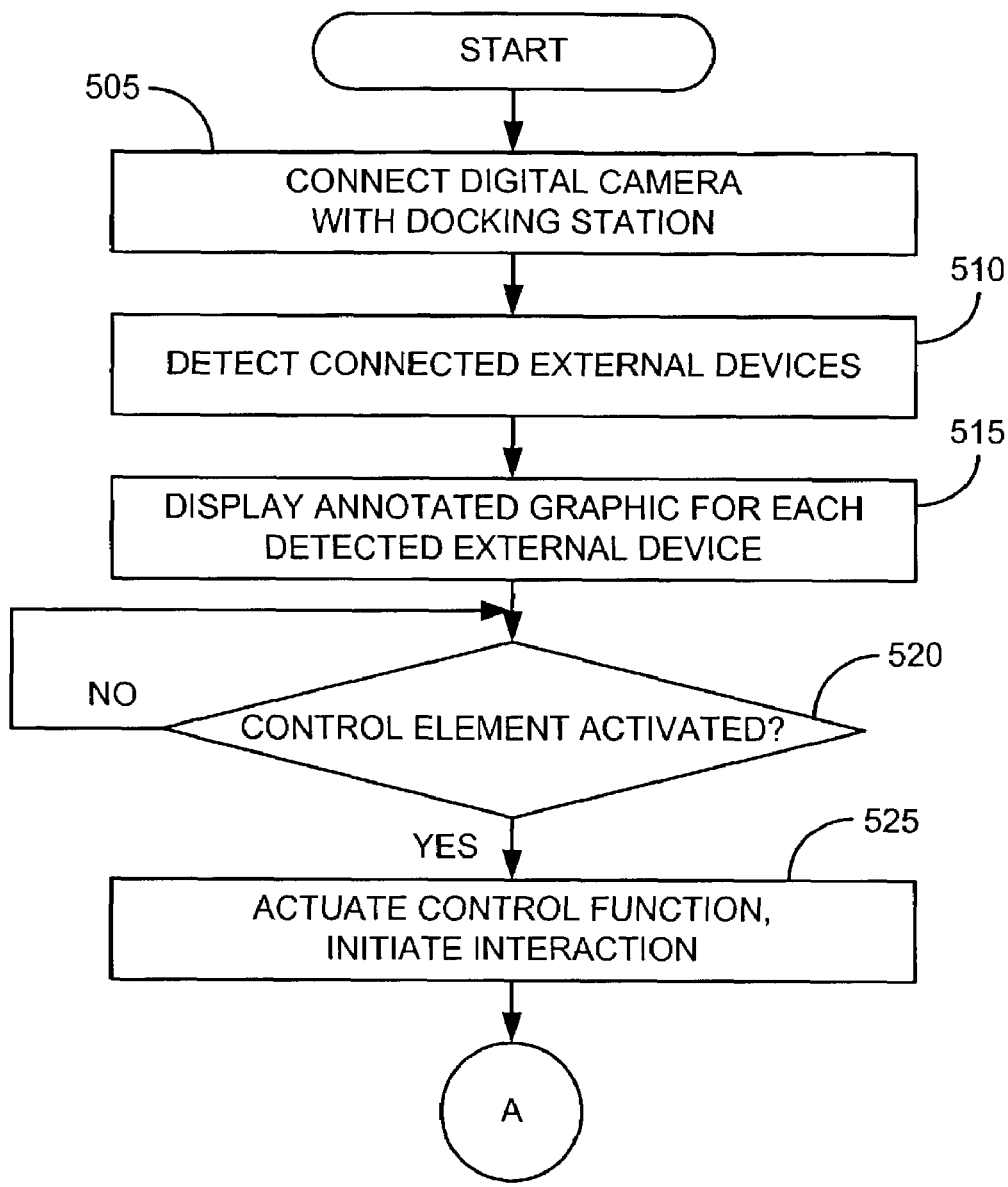
FIGS. 5A and 5B are a flowchart of the operation of the digital camera docking system shown in FIG. 1 in accordance with an illustrative embodiment of the invention.
Figure 5B:
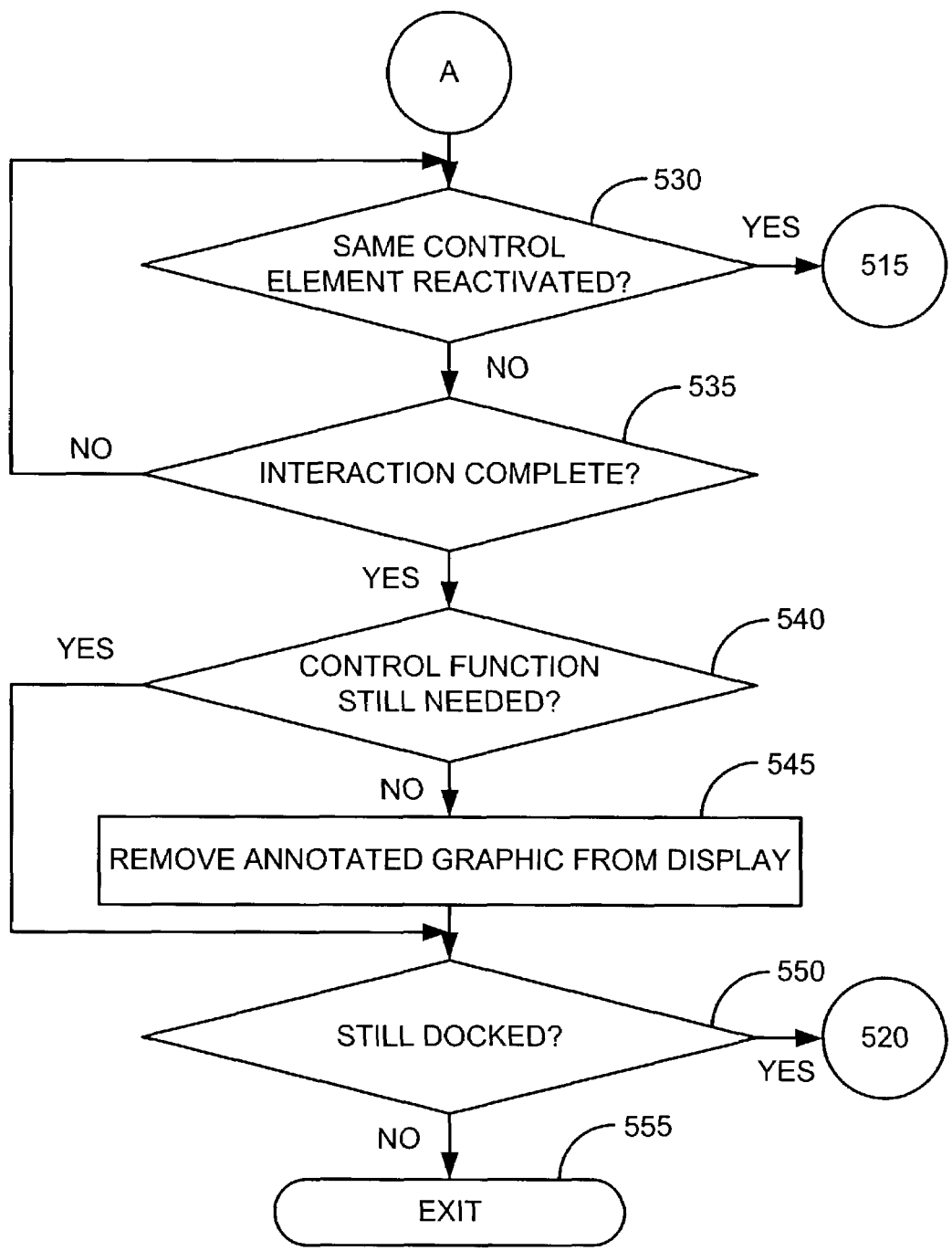

FIGS. 5A and 5B are a flowchart of the operation of the digital camera docking system 100 shown in FIG. 1 in accordance with an illustrative embodiment of the invention. At 505 in FIG. 5A, digital camera 105 is connected with docking station 110. Docking station 110, using techniques well known in the art (e.g., detection of voltages or impedances at connections 120), detects which external devices 125, if any, are connected to connections 120 at 510. At 515, digital camera 105 receives from docking station 110, via connector 115, a report of what external devices 125, if any, are connected to connections 120. Digital camera 105 may then display an annotated graphic on display 310 for each detected external device 125. If a control element 305 is activated at 520, control proceeds to 525, where the control function 205 corresponding to the activated control element 305 is actuated in response to a request from docking station 110 via connector 115. The actuation of control function 205 at 525 initiates an interaction between digital camera 105 and the external device 125 that is connected to the corresponding connection 120.

Once the interaction has been initiated, control proceeds to 530 in FIG. 5B. At 530, the reactivation of the same control element 305 that was activated at 520 may interrupt the current interaction and restore the state of display 310 to that at 515 in FIG. 5A. This allows a user to change his or her mind once an interaction has been initiated. In this case, control returns to 515 in FIG. 5A. If control element 305 is not reactivated at 530, control may proceed to 535 until the interaction is complete. If the control function associated with the just-completed interaction is no longer needed at 540, the associated annotated graphic may be removed from display 310 at 545. If the camera is still docked at 550, control returns to 520 in FIG. 5A. Otherwise, the process terminates at 555.

The foregoing description of the present invention has been presented for the purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for providing a digital camera docking system user interface, comprising:
   detecting, in a digital camera docking system comprising a digital camera connected with a docking station, the presence of at least one connected other external device, when at least one other external device is connected with the docking station;
   providing, on a display of the digital camera, information regarding the operation of the digital camera docking system; and
   wherein the information regarding the operation of the digital camera docking system comprises, for each connected other external device, a non-textual graphic representing a control element on the docking station, the control element actuating a corresponding control function that initiates an interaction of the digital camera with that connected other external device.

2. The method of claim 1, wherein the graphic is annotated with text indicating that activating the represented control element on the docking station will actuate the corresponding control function.

3. The method of claim 2, further comprising:
   removing the graphic and its associated annotation from the display after the interaction has been completed.

4. The method of claim 1, wherein the graphic is annotated with an arrow pointing to the represented control element.

5. The method of claim 1, wherein the shape of the graphic suggests the shape of the represented control element.

6. The method of claim 1, wherein the color of the graphic suggests the color of the represented control element.

7. The method of claim 1, wherein the graphic includes a pictorial representation of that connected other external device.

8. The method of claim 1, further comprising:
   terminating the interaction in response to a second activation of the control element following initiation of the interaction in response to a first activation of the control element.

9. The method of claim 1, wherein the information regarding the operation of the digital camera docking system comprises, for each connected other external device, text explaining how to initiate, from the docking station, an interaction of the digital camera with that connected other external device.

10. The method of claim 1, wherein the information regarding the operation of the digital camera docking system comprises instructions for initiating, from a connected external device, an interaction of the digital camera with the connected external device.

11. The method of claim 1, wherein the information regarding the operation of the digital camera docking system comprises an indication of the progress of an interaction of the digital camera with a connected other external device.

12. A digital camera docking system, comprising:
   a digital camera, the digital camera having a display;
   a docking station connected with the digital camera, the docking station having at least one connection for other external devices;
   a control function corresponding to each of the at least one connection for other external devices, the actuation of each control function initiating an interaction of the digital camera with the corresponding other external device connection, when an external device is connected to that connection;
   at least one control element on the docking station to actuate the control functions; and
   wherein the display provides information regarding the operation of the digital camera docking system, the information comprising, for each connected other external device, a non-textual graphic representing the control element corresponding to the control function of that connected other external device.

13. The digital camera docking system of claim 12, wherein the docking station is configured to detect the presence of at least one connected other external device.

14. The digital camera docking system of claim 12, wherein the graphic is annotated with text indicating that activating the represented control element on the docking station will actuate the control function corresponding to the other external device connection with which the detected other external device is connected.

15. The digital camera docking system of claim 12, wherein the graphic is annotated with an arrow pointing to the represented control element.

16. The digital camera docking system of claim 12, wherein the graphic includes a pictorial representation of that connected other external device.

17. The digital camera docking system of claim 12, wherein at least two other external devices are connected with the docking station, a first of the at least two connected other external devices comprising a television monitor and a second of the at least two connected other external devices comprising one of a computer and a printer.

18. The digital camera docking system of claim 12, wherein actuating a control function corresponding to a connection with which a television monitor is connected causes the digital camera to display at least one digital image on the television monitor.

19. The digital camera docking system of claim 12, wherein actuating a control function corresponding to a connection with which a computer is connected causes the transfer of at least one digital image from the digital camera to the computer.

20. The digital camera docking system of claim 12, wherein actuating a control function corresponding to a connection with which a printer is connected causes the printing of at least one digital image on the printer.

21. The digital camera docking system of claim 12, wherein the information regarding the operation of the digital camera docking system comprises, for each connected other external device, text explaining how to initiate, from the docking station, an interaction of the digital camera with that connected other external device.

22. The digital camera docking system of claim 12, wherein the information regarding the operation of the digital camera docking system comprises instructions for initiating, from a connected external device, an interaction of the digital camera with the connected external device.

23. The digital camera docking system of claim 12, wherein the information regarding the operation of the digital camera docking system comprises an indication of the progress of the interaction, when an interaction has been initiated.

24. The digital camera docking system of claim 12, wherein the docking station is connected with the digital camera such that the display faces substantially the same direction as a portion of the docking station on which the at least one control element is situated.

25. The digital camera docking system of claim 12, wherein at least one of the at least one connections for other external devices comprises a USB connector.

26. A digital camera docking system, comprising:
means for connecting a digital camera, the digital camera having a display;
means for connecting at least one other external device;
means for detecting the presence of at least one connected other external device, when at least one other external device is connected;
means for initiating an interaction of the digital camera with the at least one connected other external device; and
means for providing, on the display, information regarding the operation of the digital camera docking system, the information comprising, for each connected other external device, a non-textual graphic that depicts the means for initiating an interaction of the digital camera with the at least one connected other external device.

27. The digital camera docking system of claim 26, wherein the information regarding the operation of the digital camera docking system further comprises, for each connected other external device, text explaining how to initiate an interaction of the digital camera with that connected other external device.

28. The digital camera docking system of claim 26, wherein the information regarding the operation of the digital camera docking system comprises instructions for initiating, from a connected external device, an interaction of the digital camera with the connected external device.

29. The digital camera docking system of claim 26, wherein the information regarding the operation of the digital camera docking system comprises an indication of the progress of the interaction, when an interaction has been initiated.

* * * * *